United States Patent
Kale et al.

(10) Patent No.: US 11,937,153 B2
(45) Date of Patent: Mar. 19, 2024

(54) METHOD FOR IMPROVING THE ESTIMATION OF EXISTENCE PROBABILITIES

(71) Applicant: Robert Bosch GmbH, Stuttgart (DE)

(72) Inventors: Adwait Sanjay Kale, Ludwigsburg (DE); Nils Uhlemann, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/876,505

(22) Filed: Jul. 28, 2022

(65) Prior Publication Data
US 2023/0071221 A1 Mar. 9, 2023

(30) Foreign Application Priority Data
Sep. 3, 2021 (DE) ...................... 10 2021 209 680.8

(51) Int. Cl.
*H04W 4/38* (2018.01)
*G06F 18/21* (2023.01)
*G06F 18/25* (2023.01)

(52) U.S. Cl.
CPC ............ *H04W 4/38* (2018.02); *G06F 18/217* (2023.01); *G06F 18/251* (2023.01)

(58) Field of Classification Search
CPC ....... H04W 4/38; G06F 18/217; G06F 18/251
See application file for complete search history.

(56) References Cited

U.S. PATENT DOCUMENTS

| 2014/0324339 | A1 | 10/2014 | Adam et al. |
| 2018/0203445 | A1* | 7/2018 | Micks ................ G06F 30/20 |
| 2019/0279000 | A1* | 9/2019 | Pfeifle ................ G08G 1/165 |
| 2022/0153306 | A1* | 5/2022 | Imran ............... B60W 30/0956 |

FOREIGN PATENT DOCUMENTS

| DE | 102019207365 A1 | 11/2020 |
| DE | 102019209154 A1 | 12/2020 |
| DE | 102019218559 A1 | 6/2021 |

* cited by examiner

*Primary Examiner* — James J Yang
(74) *Attorney, Agent, or Firm* — NORTON ROSE FULBRIGHT US LLP; Gerard A. Messina

(57) ABSTRACT

A method for improving the estimation of an existence probability of objects. The objects are detected using sensors installed in a vehicle and/or an infrastructure component. Each tracker of a sensor and/or a sensor group estimates a status of an object and its existence probability using a detection probability model. The detected objects are merged in a fusion list, and each object is assigned a state and an existence probability. Each object of the fusion list is assigned existence probabilities. Each object of the fusion list is assigned additional information indicating which sensor and/or which sensor group has/have detected the respective object in the last measuring cycle. At least sensor-specific and/or sensor-group-specific existence probabilities of fused existence probabilities and the sensor detection probability are compared in a crosscheck, and false negative cases and false positive cases are ascertained for each sensor and/or sensor groups.

8 Claims, 2 Drawing Sheets

METHOD FOR IMPROVING THE ESTIMATION OF EXISTENCE PROBABILITIES

CROSS REFERENCE

The present application claims the benefit under 35 U.S.C. § 119 of German Patent Application No. DE 10 2021 209 680.8 filed on Sep. 3, 2021, which is expressly incorporated herein by reference in its entirety.

FIELD

The present invention relates to a method for improving the estimation of existence probabilities of objects which are detected with the aid of a series of sensors, the series of sensors being installed in a vehicle and/or in infrastructure components. In addition, the present invention relates to the use of the method for improving the modeling of existence probabilities of objects detected by sensors and/or sensor groups.

BACKGROUND INFORMATION

German Patent Application No. DE 10 2019 209 154 A1 relates to an infrastructure-side acquisition of an environment during autonomous driving in which a multitude of infrastructure-side sensors acquire sensor data in an environment region of the vehicle. Fused sensor data are generated based on the acquired sensor data. In addition, environment model data are generated in a steady-state manner by an infrastructure-side evaluation of the sensor data. Objects in the environment region are located and identified. The environment model data are finally transmitted to the vehicle.

German Patent Application No. DE 10 2019 218 559 A1 relates to a method for providing information about infrastructure states for vehicles and/or infrastructure information systems. Vehicles of a vehicle fleet supply traffic data, infrastructure data and sensor data in a geographical region that can be defined and specified by a user. These data are ascertained by at least one sensor element in a respective vehicle of the vehicle fleet. A processing unit including an evaluation program receives these data and carries out the data evaluation. The combined information is provided with the aid of the processing unit and/or transmitted to at least one support system in the respective vehicles of the vehicle fleet with the aid of the processing unit.

German Patent Application No. DE 10 2019 207 365 A1 relates to a method and a device for providing an operating state of a sensor of a vehicle. Here, first environment data values are acquired in a first step with the aid of a sensor, the first environment data values representing an environment of the vehicle. In a further step, second environment data values which represent the environment of the vehicle are received, the second environment data values being acquired with the aid of an infrastructure sensor system. This is followed by the step of determining the operating state of the vehicle as a function of the first and second environment data values, and by a further step of supplying the operating state of the sensor.

To calculate existence probabilities of movement characteristics, a detection system requires detection and clutter probabilities for each movement. The clutter probability indicates the probability of a faulty measurement of a sensor at a point in space. Different approaches are available for modeling the detection and clutter probability in a tracking system. Conventional methods utilize a priori knowledge while others depend on tracking individual objects.

No detection systems are available which use the information from different sensor sources and over time generate online existence probability modeling therefrom. Detection and clutter probabilities are dependent on environmental conditions, which change, for instance because of the weather, seasonal vegetation or the light when dusk is approaching. If more than two sensors monitor a region, it can often be found that false negative cases and false positive cases of a single sensor can be identified by a comparison with the fused result of all sensors. If the information about false negative and false positive cases is summed over time, detection and clutter probabilities are able to be adapted or improved, which in turn leads to greater accuracy of the existence probability estimate and thus to a reduction in false negative cases and false positive cases.

Such learning models facilitate the detection of correct and possibly false assumptions and a priori definitions in a detection and clutter modeling. Learning models of this type allow for a better adaptation of detection systems, in particular a better adaptation to changing environmental conditions.

SUMMARY

According to the present invention, a method is provided for improving the estimation of an existence probability of objects that are detected with the aid of a series of sensors, the series of sensors being installed in a vehicle or in infrastructure components. In the method according to an example embodiment of the present invention, at least the following method steps are cycled through:
a) Each tracker of a sensor and/or a sensor group estimates a status of an object and its existence probability with the aid of a detection probability model,
b) the objects are merged in a fusion list, and each object is assigned a state and an existence probability,
c) each object of the fusion list is assigned existence probabilities, specific to a sensor or sensor group, exhibited by the sensor and/or the sensor group,
d) each object of the fusion list is assigned additional information indicating which sensor and/or which sensor group has/have detected the respective object in the last measuring cycle,
e) at least sensor-specific and/or sensor-group-specific existence probabilities, fused existence probabilities and the sensor detection probability are checked in a crosscheck, and false negative cases as well as false positive cases are ascertained for each sensor and each sensor group,
f) the false negative cases and false positive cases of the sensor ascertained according to e) are stored in accordance with a position of the sensor in the fusion list according to b) on a map in a manner specific to the sensor or the sensor group, and
g) with the aid of the false negative cases and the false positive cases from the past stored in f), the modeling of the detection and clutter probability is adapted via a feedback branch.

In an advantageous manner, the feedback of false negative cases and/or false positive cases of the respective sensors to the modeling components is achieved with the aid of the method provided according to the present invention, that is, the modeling of the detection probability and clutter probability. The estimate obtained by the modeling therefore becomes much more precise, which means that the agreement with the actual presence of objects in the environment can be considerably increased. This makes it possible to greatly improve the meaningfulness of the estimation of the existence probability.

In a further advantageous example embodiment option of the method provided according to the present invention, false negative cases or false positive cases assigned to the object are stored, in a manner specific to the sensor or the sensor group, in the false negative list and the false positive list as a function of the position of the object in the fusion list.

In the method provided according to the present invention, the following are compared to one another within the framework of the crosscheck according to e):
sensor- or sensor group-specific existence probabilities,
additional information of the sensor or the sensor group,
fused existence probabilities, and
sensor detection probabilities.

In one advantageous example embodiment of the method according to the present invention, the number of false negative cases and the number of false positive cases is considerably reduced after cycling through method steps a) through g).

In a further development of the method according to the present invention, through the consideration of the false negative cases fed back via the feedback branches to the detection/existence probability model and/or clutter probability model, and the false positive cases likewise fed back, a first assumption of the detection and clutter probabilities is transformed into an improved assumption.

In the method provided according to the present invention, an assumed detection probability of a first sensor is improved by sensor-specific false negative cases or sensor-specific false positive cases for a first sensor.

As an alternative, in the method according to the present invention, an assumed detection probability of a sensor group is able to be improved by sensor-group-specific false negative cases or sensor-group-specific false positive cases for the respective sensor group.

In addition, the present invention relates to the use of the method for improving the modeling of existence probabilities of objects detected by the sensor and/or the sensor group.

The method provided according to the present invention advantageously makes it possible to achieve a learning effect. If the information about the false negative cases and the false positive cases of the detected objects are summed over time, then the modeling accuracy of the detection probability and the clutter probability is able to be adapted and considerably improved. The calculation of the existence probability becomes much more precise as a result, which in turn reduces the number of false negative cases and false positive cases. Learning models of this kind make it possible to improve correct and possibly false assumptions in a priori definitions of detections and clutter modeling. These learning models allow for an automatic improvement of detection systems; more specifically, changing environmental influences are able to be utilized for a continual improvement.

With the aid of the solution provided according to the present invention, the output of an existence probability estimation for road users may be significantly improved. The solution according to the present invention provides a method that makes it possible, due to the feedback branches for false negative cases and for false positive cases, to optimize the input variables required for estimating the existence probability in an online manner.

In the method provided according to an example embodiment of the present invention, the adaptation of the modeling of the detection and/or clutter probability is able to be separated from the application of the adapted modeling of the detection and/or clutter probability. This means that they are applied only after an initial adaptation phase in which the modeling of the detection and/or clutter probability is improved. For example, the method provided according to the present invention is able to be used as an infrastructure-based detection system. A manhole cover, for instance, which is regularly erroneously detected as an object, is able to be suppressed at this location via an increased clutter probability. In addition, regions covered by trees and not visible are able to be provided with a reduced detection probability by the present method. A false negative case at the output of the fusion is thereby prevented. Alternatively, there is the option of using the method provided by the invention as a vehicle-based detection system. The self-reflections at the own trailer, which erroneously lead to the creation of an object, is able to be suppressed in this way via an increased clutter probability at this location. Weather-related influences, for example, may furthermore lead to a reduced detection probability at great distances by the method according to the present invention. A false negative case at the output of the fusion is thus prevented.

BRIEF DESCRIPTION OF THE DRAWINGS

Embodiments of the present invention are described in greater detail below using the figures.

DETAILED DESCRIPTION OF EXAMPLE EMBODIMENTS

Figure 1:
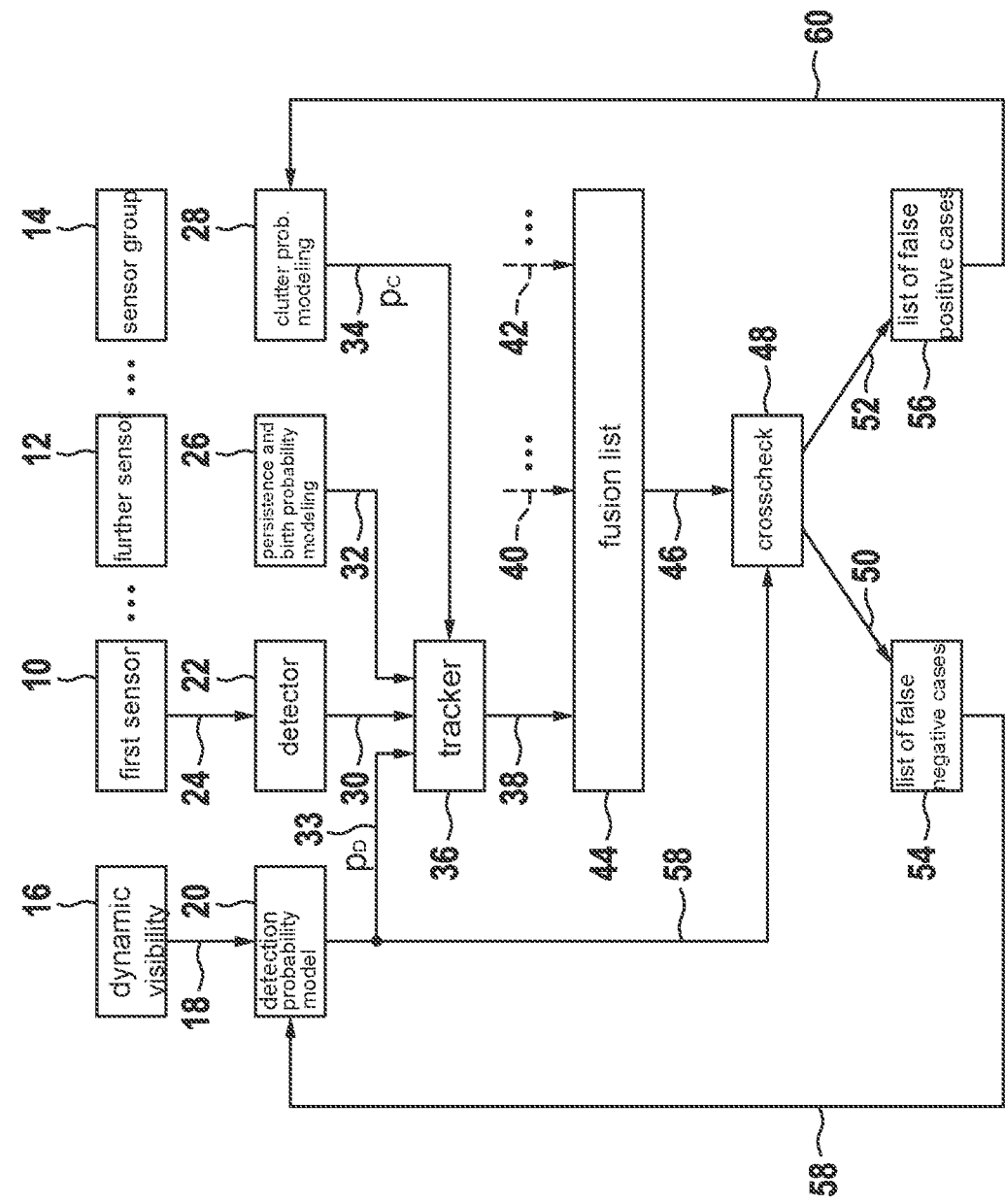
FIG. 1 shows a schematic representation of a feedback circuit for detected false negative cases and false positive cases of a sensor to improve the modeling of a detection probability and of clutter modeling, according to an example embodiment of the present invention.

In the following description of example embodiments of the present invention, the same or similar elements are denoted by identical reference numerals and a repeated description of these elements is dispensed with in individual cases. The figures represent the subject of the present invention merely schematically.

FIG. 1 shows the feedback of ascertained false negative cases and false positive cases from one or more sensor(s) to modeling components.

It can be gathered from the illustration according to FIG. 1 that multiple sensors, e.g., a first sensor 10 and a further sensor 12 or a sensor group 14, is/are provided, by which objects 30 in the environment of a vehicle are detected according to a dynamic visibility 16. Depending on the dynamic visibility 16, visibility information 18 is transmitted to a detection probability model 20.

Via first sensor 10, sensor data 24 are transmitted to a detector 22. Through the persistence and birth probability modeling 26 of first sensor 10, modeling data 32 $p_B$, $p_P$ are transmitted to a tracker 36 of first sensor 10. Similar to detection and clutter probabilities, persistence and birth probabilities are supplementary probabilities (parameters for the calculation of an existence probability). The persistence probability indicates the probability whether an object will actually still exist in the next time step. The birth probability indicates the probability of the new creation of an object. The persistence and birth probability (like the detection and clutter probabilities) must also be modeled across the possible detection space (visual field of the sensors).

In addition, corresponding data 34 (see $p_C$) are forwarded to tracker 36 according to clutter probability modeling 28 for first sensor 10. Moreover, information from detection probability model 20 are transmitted as data $p_D$ 33 to tracker 36. The data ascertained in tracker 36 from the mentioned information are conveyed to a fusion list 44 as objects 38 detected by first sensor 10. The clutter model describes the clutter probabilities of a sensor at different spatial locations. $p_C$ represents the clutter probability of a sensor at a spatial location (see Pos. 34 in FIG. 1). $p_P$, modeling data 32 of persistence birth probability model 26, denotes the persistence probability. $p_D$ (see Pos. 33 in FIG. 1) represents the detection probability, which is an output variable of the detection probability model.

According to the number of sensors, corresponding components, as described earlier in connection with first sensor 10, are assigned to each sensor 10, 12 or each sensor group 14 installed in a vehicle, which means that fusion list 44 includes the fused, merged objects 30 that were detected by all sensors 10, 12 and/or all sensor groups 14. It may be gathered from the illustration according to FIG. 1 that the objects detected by tracker 36 are made available to fusion list 44 as objects 38 detected by first sensor 10. Positions 40 and 42 denote objects acquired by a further, second sensor 12 or by a third sensor and are conveyed to fusion list 44.

Within the framework of a crosscheck 48 to which the fused, merged objects 46 are conveyed in their respective order in fusion list 44, the sensor-specific or sensor-group-specific existence probabilities, additional information of sensors 10, 12 or sensor groups 14, fused existence probabilities and/or sensor detection probabilities are compared with one another. False negative cases 50 and false positive cases 52 that are assigned to first sensor 10 result from the comparison. The corresponding false negative cases 50 and corresponding false positive cases 52 are stored in a list 54 of the false negative cases of first sensor 10 and in a list 56 of the false positive cases of first sensor 10.

In the method provided according to the presented invention, the false negative cases 50 for first sensor 10 and the false positive cases 52 assigned to first sensor 10 stored in lists 54, 56 are conveyed online via feedback branches 58, 60 to detection probability modeling 20 and also to clutter probability modeling 28. As a result, both the ascertained false negative cases 50 and the false positive cases 52 are utilized to improve the estimations stored in detection probability model 20 and in clutter probability model 28. In this way, a considerable improvement of the bases that form the foundation of the estimation of the existence probabilities is produced over the course of time.

Detector 22, which is assigned to first sensor 10, supplies its detections, i.e., objects 30 of interest such as road users and infrastructure elements, to tracker 36. Objects 30 correspond to sensor data 24 that first sensor 10 conveys to detector 22. Tracker 36 uses the detections, i.e., objects 30, to estimate an object status with regard to the position and speed using Kalman processing. For each object 30, tracker 36 also estimates an existence probability based on certain probability models such as detection probability model 20 or clutter probability modeling 28.

Via tracker 36 and the estimated states of object 30 with regard to the position and speed and also the corresponding existence probability, the objects 38 detected by first sensor 10 are transmitted to fusion list 44, which merges the information from all sensors 10, 12 and/or from all sensor groups 14 in fusion list 44.

With the aid of the comparison conducted during crosscheck 48, false negative cases 50 and also false positive cases 52 assignable to first sensor 10 are ascertained. The ascertainment of these false negative cases and false positive cases 52 is conducted for all relevant sensors 10, 12 of the vehicle or for all relevant sensor groups 14. Via feedback branches 58, 60, these ascertained false negative cases 50 and false positive cases 52 are used to improve modeling 20, 28.

Figure 2:
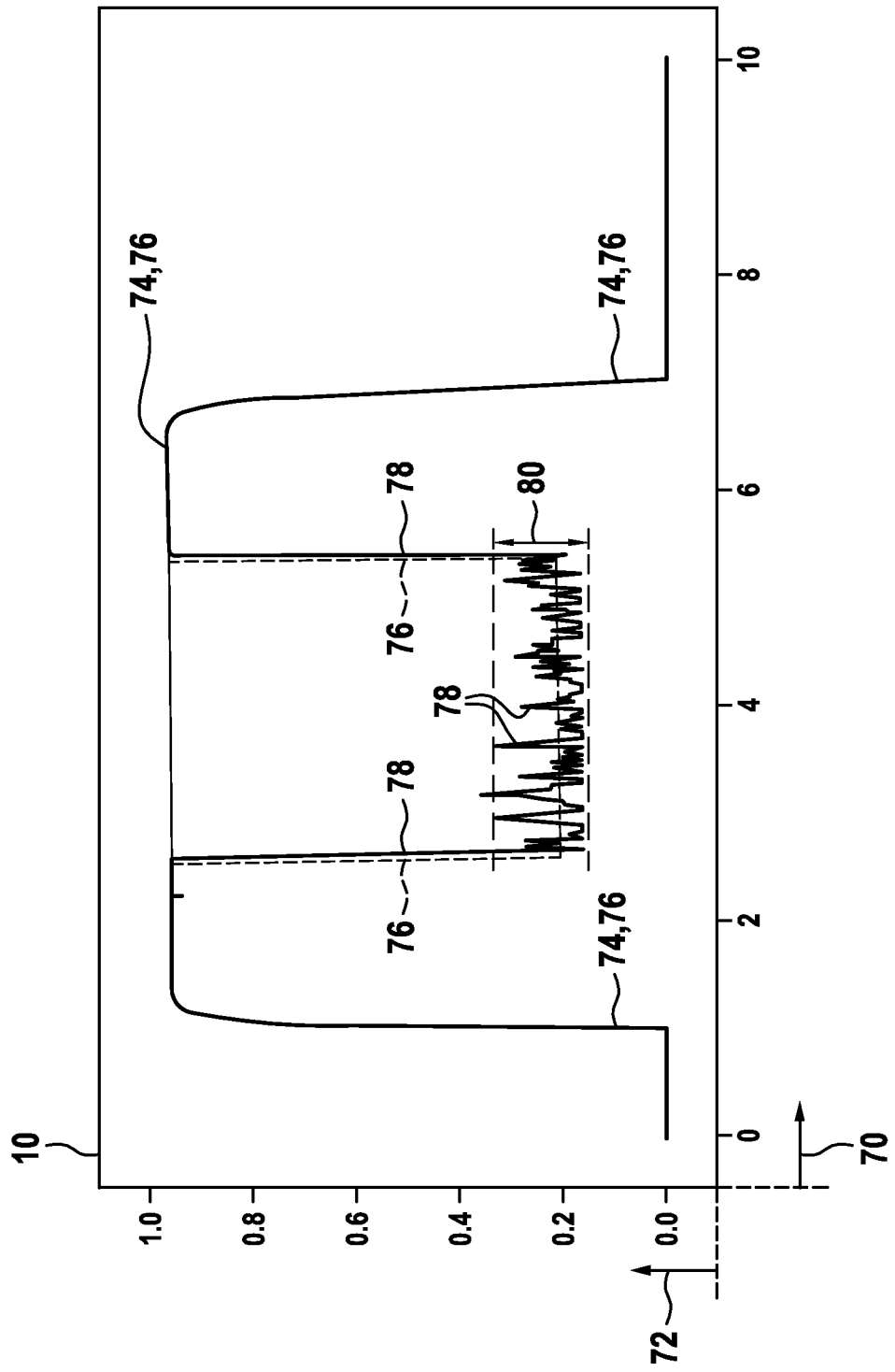
FIG. 2 shows an improved detection probability of a sensor, according to an example embodiment of the present invention.

For example, it may be gathered from the illustration according to FIG. 2 that a probability rate of an existence 72 is plotted over a distance 70.

Curved line 74 denotes an assumption of an existence of an object 30. In the region between 2.5<x<5.5, however, the actual existence of the object is given by curved line 76, which differs considerably from assumption 74. However, if the originally made assumption of an existence 74 within the framework of false negative cases 50 of first sensor 10, which is listed in list 54 for false negative cases 50 of first sensor 10, is improved, then a fluctuation width 80 comes about and an assumption 78 improved within the range 2.5<x<5.5 of the probability of the existence of object 38 recorded by first sensor 10.

The solution according to the present invention therefore makes it possible to considerably improve the initially made a priori assumption of an existence 74 through the feedback of false negative cases 50 to modeling components 20, 28. The improved assumption 78 within fluctuation width 80 still includes outliers, but these come much closer to reality than the originally made a priori assumption of an existence 74 of objects that were detected by first sensor 10.

The present invention is not restricted to the described exemplary embodiments and the emphasized aspect therein. Instead, a multitude of modifications that lie in the scope of the actions considered by the expert are possible within the scope of the present invention.

What is claimed is:

1. A method for improving an estimation of an existence probability of a plurality of objects that are detected using a plurality of sensors, the sensors being installed in a vehicle and/or infrastructure components, the method comprising the following steps:
    a) estimating, by a tracker of each sensor of the sensors and/or by trackers of a group of sensors, a status of an object of the plurality of objects and its existence probability using a detection probability model;
    b) merging the plurality of objects in a fusion list, and each object of the plurality of objects is assigned a state and the existence probability;
    c) assigning each object of the fusion list sensor-specific or sensor-group-specific existence probabilities, which are respectively exhibited by the sensor and/or the sensor group;
    d) assigning each object of the fusion list information indicating which sensor and/or which sensor group detected the respective object in a last measuring cycle;
    e) comparing at least the sensor-specific and/or sensor-group-specific existence probabilities of fused existence probabilities and a sensor detection probability within a crosscheck, and ascertaining false negative cases and false positive cases for each sensor and/or sensor group;
    f) storing the false negative cases and the false positive cases of each sensor or the sensor group ascertained according to step e) in accordance with a spatial position of the sensor or the sensor group in the fusion list according to step b) on a map specific to the sensor or the sensor group; and g) using the false negative cases and the false positive cases stored in f), adapting a modeling of a detection and clutter probabilities via at least one feedback branch.

2. The method as recited in claim 1, wherein false negative cases or false positive cases assigned to each object are stored, in a manner specific to the sensor or the sensor group, in a false negative list or a false positive list as a function of the position of the object in the fusion list.

3. The method as recited in claim 1, wherein in the crosscheck according to step e), the following are compared to one another: the sensor-specific or sensor-group-specific existence probabilities, additional information of the sensor or the sensor group, fused existence probabilities, and the sensor detection probabilities.

4. The method as recited in claim 1, wherein after cycling through the method steps a) through g), a number of false negative cases and a number of false positive cases is reduced.

5. The method as recited in claim 1, wherein through consideration of the false negative cases and false positive cases fed back via the at least one feedback branch to the detection probability model and the clutter probability model, a first assumption of an existence probability of an object is transformed into a more accurate assumption of the existence probability.

6. The method as recited in claim 1, wherein an accuracy of an assumed detection probability of a first sensor is improved by sensor-specific false negative cases or false positive cases for the first sensor.

7. The method as recited in claim 1, wherein an accuracy of an assumed detection probability of a first sensor group is improved by sensor-group-specific false negative cases or false positive cases for the first sensor group.

8. The method as recited in claim 1, wherein the method improves an accuracy of the modeling of existence probabilities of objects detected by the sensors and/or the sensor groups.

* * * * *